United States Patent
Bansal et al.

(10) Patent No.: US 10,275,505 B2
(45) Date of Patent: Apr. 30, 2019

(54) IN-APPLICATION CONVERSION OF FILE VERSIONS USING CLOUD SERVICES

(71) Applicant: Adobe Inc., San Jose, CA (US)

(72) Inventors: Kaustubh Bansal, Faridabad (IN); Ashish Duggal, Delhi (IN); Sumit Dey, Noida (IN)

(73) Assignee: Adobe Inc., San Jose, CA (US)

( * ) Notice: Subject to any disclaimer, the term of this patent is extended or adjusted under 35 U.S.C. 154(b) by 536 days.

(21) Appl. No.: 14/313,660

(22) Filed: Jun. 24, 2014

(65) Prior Publication Data

US 2015/0370874 A1  Dec. 24, 2015

(51) Int. Cl.
*G06F 9/48* (2006.01)
*G06F 17/30* (2006.01)

(52) U.S. Cl.
CPC .......... *G06F 17/30569* (2013.01); *G06F 9/48* (2013.01)

(58) Field of Classification Search
CPC .................................. G06F 17/30; G06F 9/48
See application file for complete search history.

(56) References Cited

U.S. PATENT DOCUMENTS

| | | | | |
|---|---|---|---|---|
| 6,393,442 B1* | 5/2002 | Cromarty | ............ | G06F 17/2247 715/205 |
| 8,140,953 B1* | 3/2012 | Weaver | ............. | G06F 17/30038 715/202 |
| 2004/0220982 A1* | 11/2004 | Probert, Jr. | ....... | G06F 17/30569 |
| 2005/0278615 A1* | 12/2005 | Wang | ................ | G06F 17/30569 715/234 |
| 2008/0065781 A1* | 3/2008 | Davis | .................... | H04L 65/607 709/231 |
| 2008/0091699 A1* | 4/2008 | Nakashima | ........... | G06F 17/227 |
| 2008/0222216 A1* | 9/2008 | Jorden | ....................... | G06F 8/70 |
| 2010/0088587 A1* | 4/2010 | Ding | .................. | G06F 17/2288 715/229 |
| 2011/0078674 A1* | 3/2011 | Ershov | ...................... | G06F 8/75 717/170 |
| 2012/0254204 A1* | 10/2012 | Pryor-Miller | ......... | G06F 17/289 707/756 |
| 2013/0014000 A1* | 1/2013 | Popov | .................. | G06F 17/217 715/234 |
| 2013/0185339 A1* | 7/2013 | Clay | ................... | G06F 17/2205 707/821 |
| 2013/0198620 A1* | 8/2013 | Zhou | ..................... | G06F 17/217 715/255 |
| 2014/0108353 A1* | 4/2014 | Awe | .................... | G06F 11/1446 707/649 |

(Continued)

*Primary Examiner* — Asher D Kells
(74) *Attorney, Agent, or Firm* — Wolfe-SBMC

(57) ABSTRACT

In-application file conversion using cloud services is described. In one or more embodiments, an application determines that a file includes features inserted by a subsequent version of the application. The application sends a request to a conversion service to convert the file to a format that is compatible the application. The application receives a converted file from the conversion service that is compatible with the application. The conversion service has multiple versions of application server software to convert files, a job queue to store requested conversion jobs, and a job manager that determines which version of application server software to use to convert the file and invokes an instance of the determined version of the application server software to convert the file.

19 Claims, 10 Drawing Sheets

(56) References Cited

U.S. PATENT DOCUMENTS

| | | | | |
|---|---|---|---|---|
| 2014/0215302 A1* | 7/2014 | Little | .................... | G06F 17/24 |
| | | | | 715/229 |
| 2014/0215303 A1* | 7/2014 | Grigorovitch | ........ | G06F 17/212 |
| | | | | 715/229 |
| 2014/0215391 A1* | 7/2014 | Little | ................. | G06F 17/2264 |
| | | | | 715/810 |
| 2014/0344340 A1* | 11/2014 | Tang | .................. | H04L 67/2823 |
| | | | | 709/203 |
| 2015/0006684 A1* | 1/2015 | Chu | ................... | G06F 9/44552 |
| | | | | 709/220 |
| 2015/0067003 A1* | 3/2015 | MacLeod | ......... | G06F 17/30115 |
| | | | | 707/827 |

* cited by examiner

Fig. 4b

502
Determine in an application that a file includes features inserted by a subsequent version of the application

504
Send a request to a conversion service to convert the file to a format compatible with the application

506
Receive a converted file that is compatible with the application

602
Determine that a file includes portions marked as changed relative to a previous version of the file

604
Send a request to convert the portions of the file that are marked as changed from the previous version of the file

606
Receive a converted file including the changed portions of the file

IN-APPLICATION CONVERSION OF FILE VERSIONS USING CLOUD SERVICES

BACKGROUND

Exchanging files between content creators and consumers is a frequently performed task in content creation and distribution. Content creators and consumers may use the same software application to create, edit, or review a content file, but each user may choose to upgrade to subsequent versions of the application at different times. A file created in a newer version of the application may include features that are not available in an older version of the application. For example, an author using the most recent version of the application may insert a feature in a document that is supported in that most recent version of the application, solely. When a recipient, using a previous version of the application, receives the document file from the author, the recipient's application may not be able to process the document file or accurately display the document as the author had intended.

Conventionally, either the author needs to track the needs of individual recipients and create backward-compatible documents based on each recipient's version of the application, or the recipient of the document must contact the author and request a version of the document compatible with the recipient's version of the application. In either case, there is a burden placed on the content creators, the consumers, or both to manage the permutations of file versions required while still having access to the latest features available in the software application.

SUMMARY

In-application file conversion using cloud services is described. In one or more embodiments, an application determines that a file includes features inserted by a subsequent version of the application that are not compatible with the application. The application sends a request to a conversion service to convert the file to a format that is compatible the application. The application receives a file that is converted from the subsequent version to the format that is compatible with the application.

Additionally, a conversion service has a job manager and a plurality of versions of application server software, each version corresponding to one of a plurality of versions of a client application. The job manager receives a job request from the client application to convert a file in a first format to a second format. The file includes features, inserted by a subsequent version of the client application, that are not compatible with the version of the client application. The job manager determines for the conversion job which version of the plurality of versions of the application server software to use for the conversion job. Once a determination is made, the job manager invokes an instance of the determined version of the application server software to convert the file from the first format to the second format. The application server software receives conversion jobs from the job manager and converts the file associated with the conversion job from the first format to the second format that is compatible with the version of the client application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4b is an example embodiment showing the side-by-side display of a converted file and a second converted file in an application-independent format.

DETAILED DESCRIPTION

Overview

Figure 1:
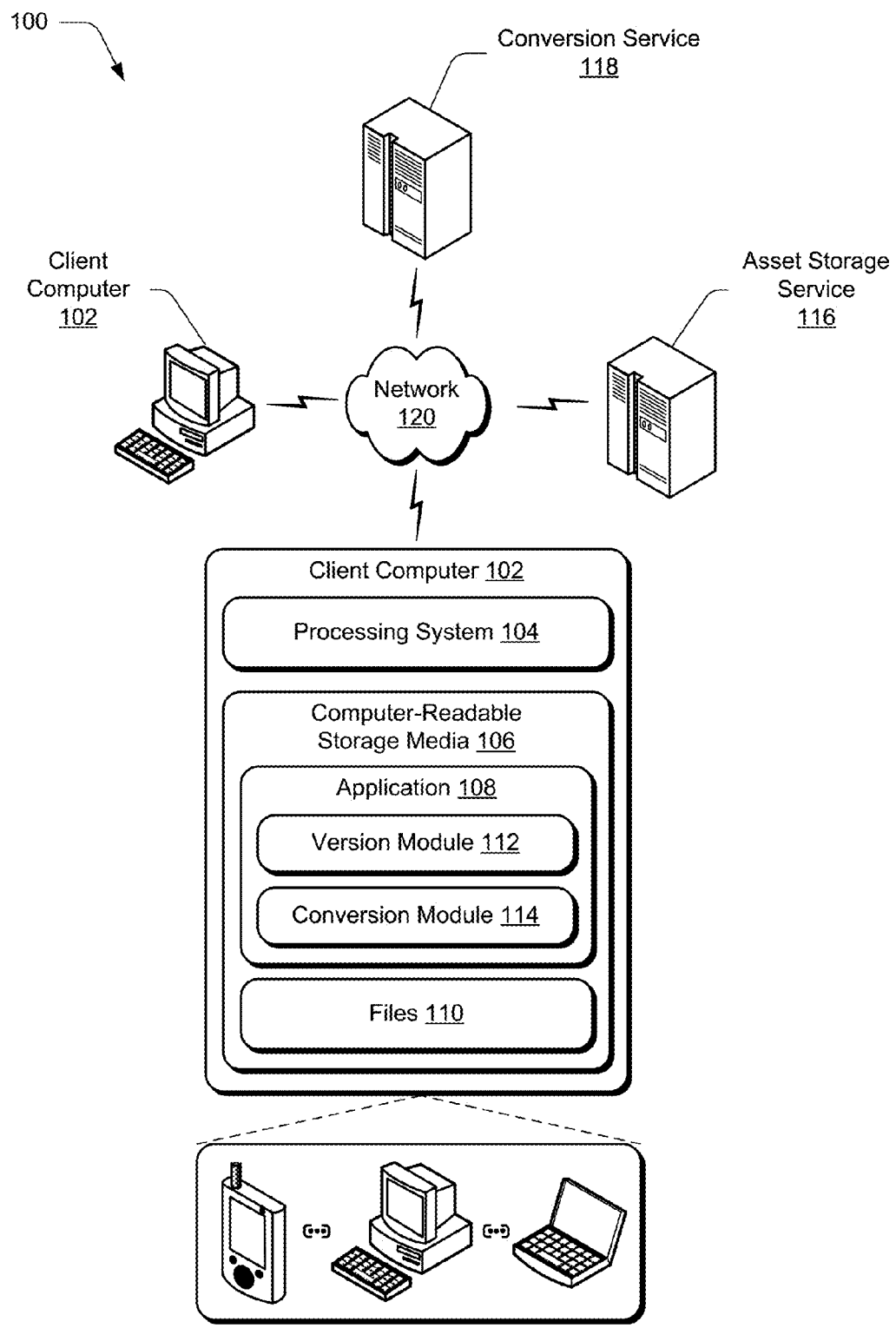
FIG. 1 is an illustration of an environment in an example embodiment that is operable to employ techniques described herein.

Converting and exchanging content files between users of different versions of an application may be time-consuming for both the content creators and the content consumers who use the application. As successive versions of an application are created, new features may be added in a subsequent version that are not available in, and are not compatible with, previous versions of the application. Consider an example in which an author of a document is creating the document in the subsequent version of an application, and the author is working with a reviewer who is using a previous version of the application. When the reviewer receives a file from the author, the reviewer may not be able to open the file created using the subsequent version of the application with the previous version of the application. The reviewer then needs to contact the author and have the author save the document in a backward-compatible file format, which the reviewer can open in the previous version of the application. However, if the author has included features in the document that only the subsequent version of the application supports, the backward-compatible file may not include these features, or the reviewer's previous version of the application may not display them correctly. Consequently, the management of file versions and differences in the document between the different versions of the application makes the collaboration between the author and reviewer is less efficient.

When content is created or edited in the subsequent version of the application, the subsequent version of the application may store the content in one format, or in a combination of formats, in the file. The choice of the formats used to store the content affects how the content can be handled when the file is opened in the previous version of the application. For example, the subsequent version of the application may save model data, computed data, or both in the file.

The model data describes elements of the content and may be stored in various ways, such as in a database of key-value pairs, as tagged data in a markup language, or any other suitable format. Further, the model data may be saved in any of these formats in an application-specific format or an interchangeable format, such as eXtensible Markup Language (XML). The model data created by the subsequent version of the application may, in some cases, be at least partially compatible with the previous version of the application. The previous version of the application may be capable of ignoring the elements in the file that it does not support, and processing and displaying those elements that are compatible with the previous version of the application. This may result in an inaccurate presentation of the content that was created in the subsequent version of the application. Alternatively, the previous version of the application may fail to open the file and display the content, when it encounters unsupported elements in the file.

Saving the computed data with the model data in the file, allows the file to be opened and presented more quickly. All the calculations that are required to determine how to present the elements in the content are pre-computed to create the computed data and are then stored in the file. Saving both the model data and the computed data increases the size of the file, but provides access to all the elements for editing coupled with significantly faster presentation of the content when the file is opened. As with the model data, the previous version of the application may not correctly display, or fail to display, the computed data saved by the subsequent version of the application.

In-application file conversion using cloud services is described. In one or more embodiments, an application determines that a file includes features inserted by a subsequent version of the application that are not compatible with the application. Based on a user's decision, the application sends a request to a conversion service to convert the file to a format that is compatible the application. The application receives a file that is converted from the subsequent version to the format that is compatible with the application.

Consider an example where a reviewer, using an application, receives a file from an author who has created the file using a subsequent version of the application. When the reviewer uses the application to open the file, the application determines that the file includes features created in the subsequent version of the application. The application presents an indication to the reviewer that the file was created in the subsequent version of the application and that the file can be converted by a cloud service into a format compatible with the reviewer's previous version of the application. The reviewer may choose to send a request to the conversion service to convert the file and in response to the request receive a converted file that is compatible with the reviewer's previous version of the application.

In the request to convert the file, the reviewer may specify parameters for the conversion, such as converting the file into a second application-independent format that will accurately display the content as it would be displayed in the subsequent version of the application. The reviewer can see how the finished content will look, even if the previous version of the application cannot accurately display the elements of the content that are unique to the subsequent version of the application. The request may include an asset identifier that can be used to access the file and/or store the converted files, such as a location in an asset storage service, such as Adobe® Creative Cloud® or a cloud storage service.

In one or more embodiments, a conversion service has a job manager and a plurality of versions of application server software, each version corresponding to one of a plurality of versions of a client application. The job manager receives a job request from the client application to convert a file in a first format to a second format. The file includes features, inserted by a subsequent version of the client application, that are not compatible with the version of the client application. The job manager determines for the conversion job which version of the plurality of versions of the application server software to use for the conversion job. Once a determination is made, the job manager invokes an instance of the determined version of the application server software to convert the file from the first format to the second format. The application server software receives conversion jobs from the job manager and converts the file associated with the conversion job from the first format to the second format that is compatible with the version of the client application.

Consider an example in which a conversion service receives a request from an application to convert a file created in a subsequent version of the application to produce a converted file that is in a format compatible with the previous version of the application that sent the request. A job manager receives the request and creates a conversion job for the request including any parameters that were specified in the request. The job manager may enqueue the conversion job in a job queue, which maintains pending conversion jobs for the conversion service, until resources are available to perform the conversion job. When the job manager determines that resources of the conversion service are available to process the conversion job, the job manager dequeues the conversion job and determines, from the parameters in the conversion job, a version of the plurality of available versions, of application server software that is capable of converting the file. The job manager invokes an instance of the determined version of the application server software with the parameters from the conversion job.

The invoked version of the application server software converts the file according to the parameters in the conversion job to produce the converted file. If the parameters of the request also specify producing an application-independent version of the file, the invoked application server software produces the application-independent version of the file in an application-independent format, such as in an Adobe® PDF format, a Portable Network Graphic (PNG) format, or any other suitable file format. The application server software may also convert files according to other parameters, such as parameters that indicate converting only portions of the file, such as only converting portions that have been marked as changed relative to an earlier version of the file, or retrieving the file and/or storing the converted files to a location specified in an asset identifier of an asset storage service, to a location specified as a Uniform Resource Locator (URL), or any other suitable identifier of a storage location.

In the following discussion, an example environment is first described that may employ the techniques described herein. Example embodiment details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a client computer 102 having a processing system 104 that may include one or more processing devices (e.g., processors) and one or more computer-readable storage media 106. The illustrated environment 100 also includes an application 108, and files 110 embodied on the computer-readable storage media 106 and operable via the processing system 104 to implement corresponding functionality described herein. In at least some embodiments, the client computer 102 may include functionality to access web-based resources (e.g., content and services), browse the Internet, interact with online providers, and so forth as described in further detail below.

The client computer 102 may be configured as any suitable type of computing device. For example, the client computer 102 may be configured as a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the client computer 102 may range from full resource devices with substantial memory and processor resources (e.g., personal computers, game consoles) to a low-resource device with limited memory and/or processing resources (e.g., mobile devices).

The environment 100 further depicts an asset storage service 116 and a conversion service 118, configured to communicate with one or more client computers 102 over a network 120, such as the Internet, to provide a "cloud-based" computing environment. Generally speaking, the asset storage service 116 and the conversion service 118 are configured to make various resources available over the network 120 to clients. In some scenarios, users may sign up for accounts that are employed to access corresponding resources from the asset storage service 116 and/or the conversion service 118. A provider may authenticate credentials of a user (e.g., username and password) before granting access to an account and corresponding resources provided by the asset storage service 116 and/or the conversion service 118. Other resources of the asset storage service 116 and/or the conversion service 118 may be made freely available, (e.g., without authentication or account-based access). Although the application 108 on the client computer 102, the asset storage service 116, and the conversion service 118 are shown separately in the example environment 100, they may be combined and/or repartitioned in various manners to perform the example procedures, such as combining the asset storage service 116 and conversion service 118 into a single service, or providing application 108 as a cloud-based service available over network 120 to the client computer 102.

The application 108 may be any type of application that can be used to create, edit, distribute, or display content using one or more files 110. The application 108 may be used with content such as text, drawings, images, multimedia, or documents including any combination of these content elements, for example applications such as Adobe InDesign® or Adobe InDesign® Server. As with many software applications, a developer of the application 108 may periodically release new versions of the application 108. Subsequent versions of the application 108 may incorporate support for new features into the application 108. As these features are added to a subsequent version of the application 108, the subsequent version of the application 108 may insert these new features in the files 110. The subsequent version of the application 108 may be backward-compatible to use files 110 created by a previous version of the application 108. However, the previous version of the application 108 may not be forward-compatible to use, or fully use, the features included in the files 110 produced using the subsequent version of the application 108.

For various reasons, users of the application 108 may upgrade from the previous version to the subsequent version of the application 108 at different times, creating compatibility issues when the files 110 from different versions of the application 108 are exchanged between the users. The application 108 may open the file 110 stored on computer-readable storage media 106 in the client computer 102, or may open the file 110 by using an asset identifier to obtain the file 110 from the asset storage service 116. From the example of the author and reviewer, above, the author may send file 110 to the reviewer over the network 120, provide the file 110 stored on a suitable memory device, or send the asset identifier for file 110 to the reviewer, so that the reviewer may obtain the file 110 from the asset storage service 116.

The application 108 includes a version module 112 and a conversion module 114 among multiple modules that may be included in the application 108. The version module 112 determines if the file 110 is compatible with the application 108. The version module 112 may do this by examining metadata in the file 110 that indicates the version of the application 108 that produced the file 110, by identifying features in the file 110 that are not supported by the application 108, or in any other suitable manner. If a determination is made that the file 110 is incompatible with the application 108, the conversion module 114 presents the user of the application 108 with an option of using the conversion service 118 to convert the file 110 to a format that is compatible the application 108.

Figure 2:
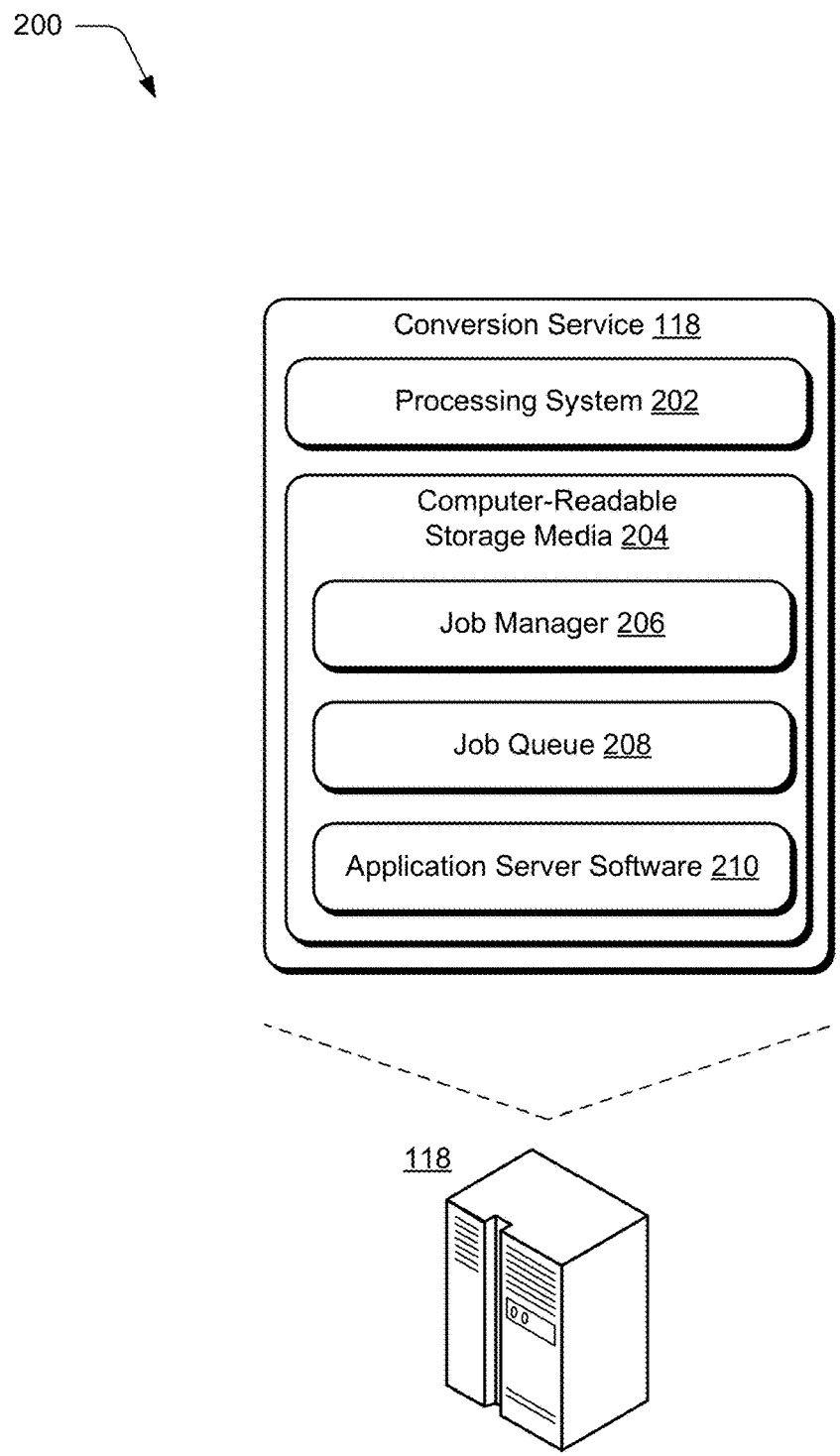
FIG. 2 illustrates the conversion service from FIG. 1 in greater detail in accordance with one or more embodiments.

FIG. 2 is an illustration of an environment 200 in an example embodiment of the conversion service 118 described herein. The example conversion service 118 as illustrated includes a processing system 202 that may include one or more processing devices (e.g., processors) and one or more computer-readable storage media 204. The illustrated conversion service 118 also includes a job manager 206, a job queue 208, and application server software 210 embodied on the computer-readable storage media 204 and operable via the processing system 202 to implement corresponding functionality described herein. In at least some embodiments, the conversion service 118 may include functionality to access web-based resources such as the asset storage service 116, a cloud storage service, and so forth as described in further detail below. Although the elements, such as the job manager 206, the job queue 208, and the application server software 210 are illustrated together in the conversion service 118, those elements may be distributed and/or combined using one or more computing devices connected directly or over one or more networks to perform the example procedures.

Having considered these example environments, consider now a discussion of some example details of the techniques of in-application file conversion using cloud services in accordance with one or more embodiments.

In-Application File Conversion Using Cloud Services

Figure 3:
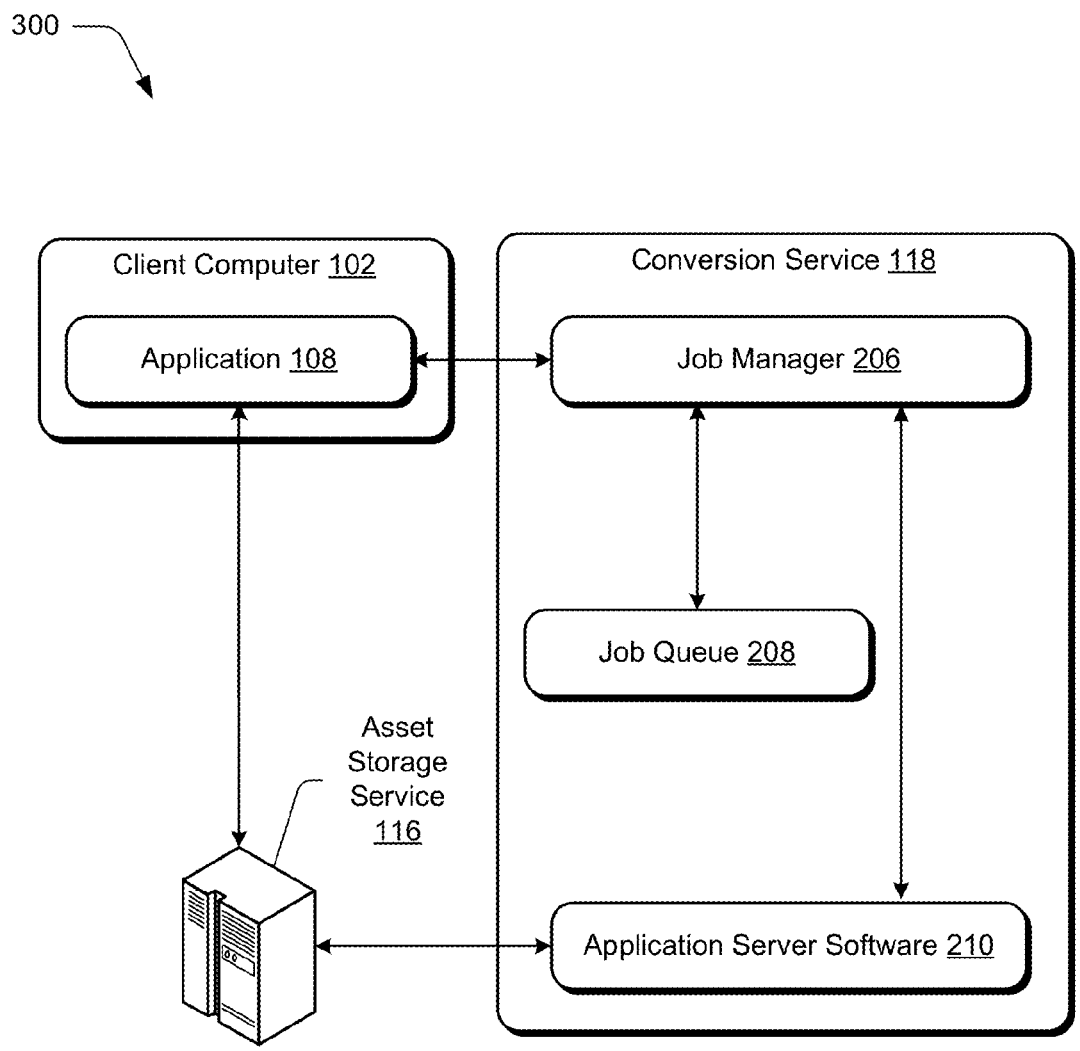
FIG. 3 illustrates the relationships between the elements from FIGS. 1 and 2 in greater detail in accordance with one or more embodiments.

This section describes some example details of in-application file conversion using cloud services in accordance with one or more embodiments. FIG. 3 depicts generally at 300 some example elements of the environment 100 of FIG. 1 and the environment 200 of FIG. 2, but in greater detail to illustrate the interactions of the example elements. In particular, the application 108 on the client computer 102, the asset storage service 116, as well as the job manager 206, the job queue 208, and application server software 210 of the conversion service 118 are depicted in greater detail.

When the application 108 determines that the file 110 is to be converted to be compatible with the application 108, the application 108 sends a job request to the job manager 206 of the conversion service 118. The job request may include various parameters, such as specifying the version of the application 108, an identifier for the location of the file 110, such as the asset identifier usable to obtain the file 110 and/or store the converted file using the asset storage service 116, or another network storage location or storage service, as well as parameters specifying options for the conversion.

The parameters for the conversion may specify converting the file 110 to produce a second converted file in an application-independent format, typically at a high resolution to provide an accurate representation of the content of the file 110 as it would be presented in the subsequent version of the application 108. The parameters for the conversion may also indicate that the conversion is to be performed solely on portions of the file 110, such as portions marked as changed with respect to a previous version of the file 110. The metadata in the file 110 contains information indicating which objects in the file 110 are changed relative to the previous version of the file 110. The information is used to mark the portions, such as specific pages in a document, as changed. A list of the portions marked as changed is saved in the file 110, for example as Extensible Metadata Platform (XMP) data.

In the example of the author and reviewer, the reviewer may have the author revise the content in the file 110 one or more times, creating multiple versions of the file 110. The application 108 can mark portions of the file 110 as having changed relative to the previous version of the file 110. The reviewer may want to shorten the conversion time by converting only those portions of the file 110 marked as changed in order to review only the changes made by the author since the last revision.

In response to receiving the job request, the job manager 206 creates a conversion job and enqueues the conversion job in the job queue 208. The job manager 206 also creates a job identifier for the request and includes the job identifier in the conversion job, as well as sends the job identifier to the application 108 in a response to the job request. The application 108 can then send a status request including the job identifier to the job manager 206, and the job manager 206 will use the job identifier to determine a status for the conversion job associated with the job identifier, and send a response to the application 108 including the status for the conversion job. Alternatively, the status of the conversion job may be obtained using the job identifier by querying the conversion service 118 from a web browser, establishing a request for, and receiving a status from, the conversion service 118, or in any other suitable manner.

The conversion service 118 maintains multiple versions of the application server software 210, each version corresponding to one of multiple versions of the application 108.

When the job manager 206 determines that resources of the conversion service 118 are available to process the conversion job, the job manager 206 dequeues the conversion job from the job queue 208, and evaluates the parameters in the conversion job to select which version of the application server software 210 to use to convert the file 110. The job manager 206 may then invoke an instance of the selected version of the application server software 210 and send the information included in the conversion job to the invoked instance of the application server software 210 to perform the file conversion according to the parameters in the job request.

Consequently, the invoked instance of the application server software 210 may receive the file 110 for conversion from the job manager 206 with the information included in the conversion job or may obtain the file 110 from a specified location, such as from the asset storage service 116 using the asset identifier included in the job request. The converted files may be stored at the specified location, a different location, or sent to the application 108 by the conversion service 118 in response to a request for the converted files.

Although the job manager 206 is illustrated as a single entity, the operations performed by the job manager 206 may also be partitioned in various ways, for example into a front end component that receives and creates conversion jobs and responds to status requests, as well as a job control component that manages the selection of conversion jobs from the job queue 208 and the processing of the conversion jobs by the application server software 210, using any suitable techniques for distributing and load balancing processing of network services.

Figure 4A:
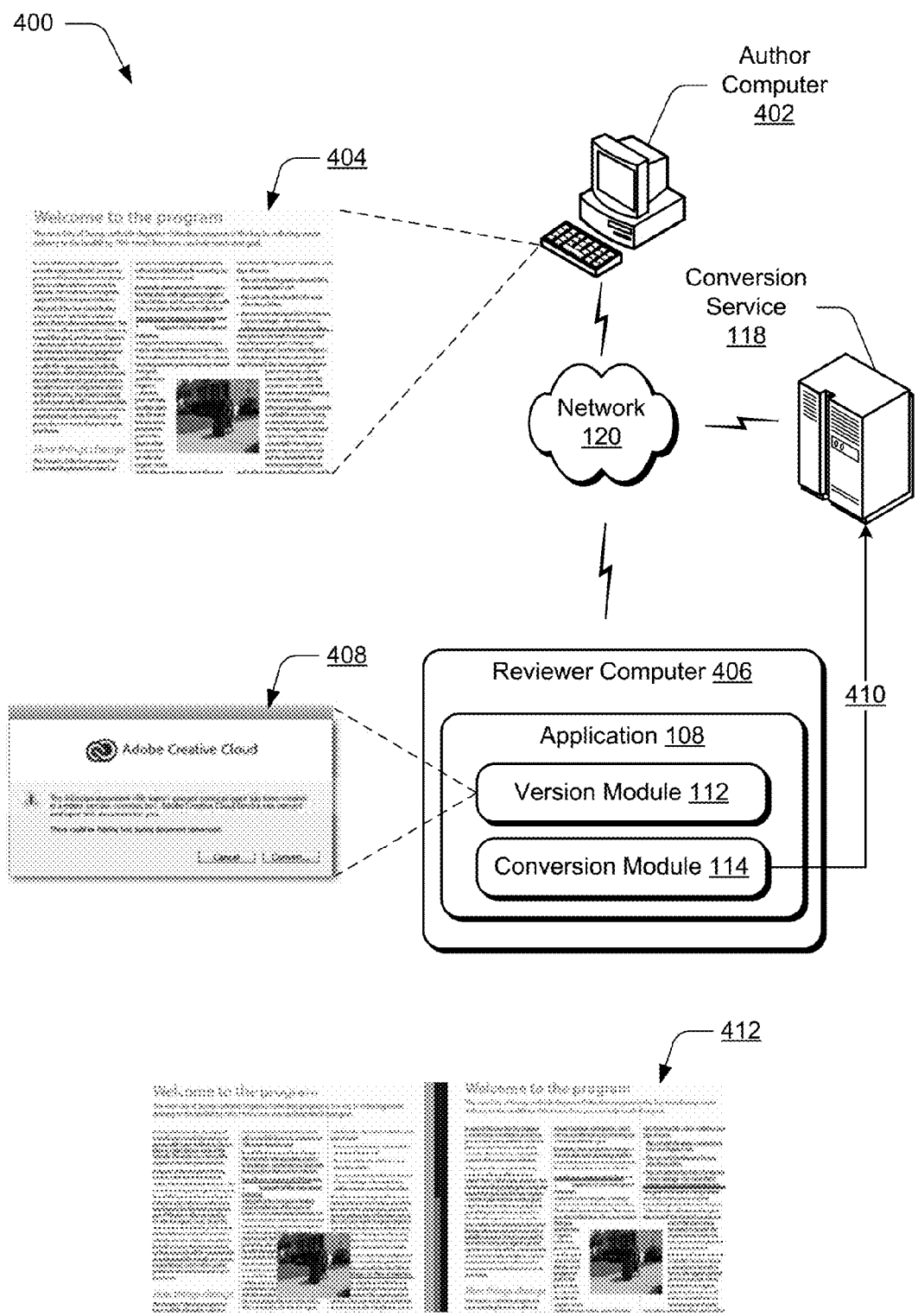
FIG. 4a is an example embodiment illustrating an example workflow of in-application file conversion using cloud services described herein.

FIG. 4a illustrates an example workflow at 400 of in-application file conversion using cloud services. In the example of the author and the reviewer, the author creates the document using the subsequent version of the application 108 installed on author computer 402. The document contains a feature, for example word wrap around an image as illustrated at 404, which is not compatible with the application 108 installed on reviewer computer 406. The reviewer may receive the file 110 containing the document from the author in any manner previously described, for example over the network 120.

When the reviewer uses the application 108 to open the file 110, the version module 112 will determine that the file 110 was created by the subsequent version of the application 108. The version module 112 examines the content of file 110 to determine an application version for the application 108 that created the file 110. For example the application 108 may examine metadata in the file 110 for version information. Consider the example metadata:

<xmp:CreaterToolVersion>10.0</xmp:CreaterToolVersion> where "10.0" indicates the version of the application 108 that created the file 110.

If the version module 112 determines that the application version indicates that the subsequent version of the application 108 created the file 110, the version module presents a user interface control, as illustrated at 408. The reviewer can select to either cancel the operation to open the file 110 or select to convert the file 110 using the conversion service 118.

When the reviewer chooses to convert the file 110, the conversion module 114 creates the job request for the conversion and sends the job request to the conversion service 118 at 410. The job request may be sent in an HTTP POST request method or in any other suitable manner. The job request includes various parameters that specify how the conversion will be performed. Consider the example parameters of an example job request below:

```
Entity:
{       "parameters": {"outputType" : "idml"},
        "inputs": ["vnd-adobe-sharedcloud.asset:cdcb1b92-f871-
434c-968c-b76783639a7f"]
}
```

The "parameters" field contains the parameters specified for the conversion. In this example, an "outputType" parameter specifies one or more file types for output files from the conversion. The "parameters" field may also contain a "version ID" parameter to indicate which version of the application server software 210 to use to perform the conversion. Alternatively, the job manager 206 may determine the version of the application server software 210 to use by examining the metadata in the file 110. The "inputs" parameter specifies a location for the file 110 that will be converted, in this case as an asset identifier. Other examples are contemplated.

Figure 4B:
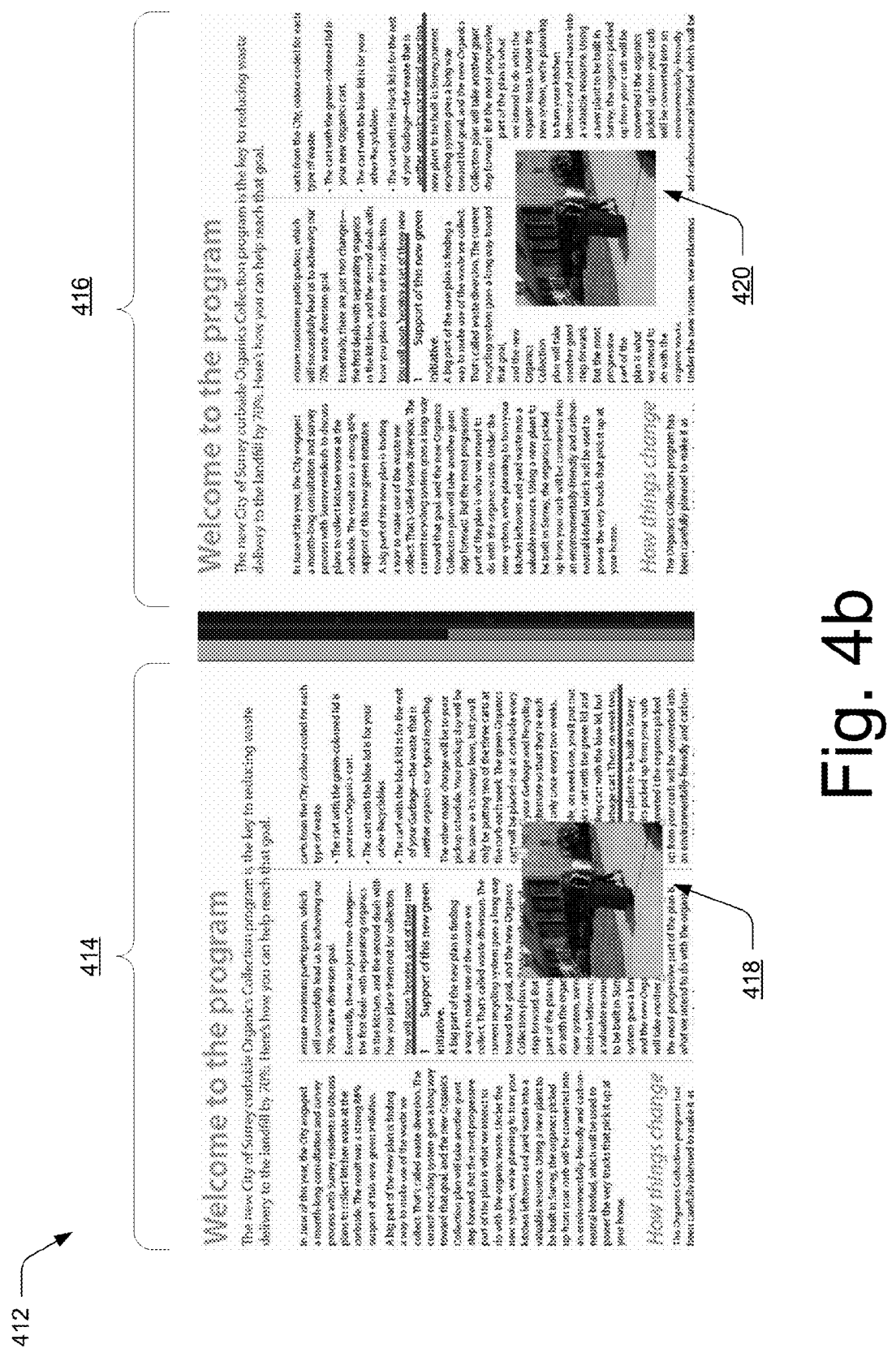

For example, the reviewer can specify in the job request that the conversion produce the second converted file in the application-independent format. The application 108 can display the converted file and the second converted file in the application-independent format side-by-side, as shown at 412 and in greater detail in FIG. 4b. In the example of the author and the reviewer, the reviewer may specify parameters for the conversion to convert the file 110 to produce the second converted file in the application-independent format that will accurately display the content as it would be displayed in the subsequent version of the application used by the author. The reviewer can see how the finished content will look, even if the previous version of the application cannot accurately display the features of the content that are only supported by the subsequent version of the application 108.

In an embodiment, the application 108 displays the converted file, at 414, next to the second converted file in the application-independent format, at 416. Features in the file 110, created in the subsequent version of the application 108, which are not supported in the application 108, may not display correctly, such as at 418. The application 108 displays the second converted file in the application-independent format, to show how the content appears in the subsequent version of the application 108, such as at 420.

In an example with the author and the reviewer, the author, using the subsequent version of the application 108, has added an image and specified that the text in the document should flow around the image, at 420. However, the application 108 lacks the feature to flow text around the image and displays the image on top of the text at 418. Displaying the second converted file in the application-independent format, at 416, next to the converted file, at 414, assures the reviewer that the author has correctly added the image and specified flowing the text around the image, as shown at 420.

Example Procedures

This section describes example procedures for in-application file conversion using cloud services in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks, and any number of the described procedures' operations can be combined in any order to implement the procedure, or an alternate procedure. In at least some embodiments the procedures may be performed by a suitably configured device, such as the example client computer 102 of FIG. 1 that makes use of the application 108.

Figure 5:
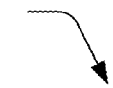
FIG. 5 is a flow diagram depicting an example procedure in accordance with one or more embodiments.

FIG. 5 depicts an example procedure 500 of in-application file conversion using cloud services. An application determines that a file includes features inserted by a subsequent version of the application. For example at 502, the application 108 determines that the file 110 includes features inserted by a subsequent version of the application 108. The application 108 may have received the file from another client computer 102 over network 120, may have retrieved the file 110 from the asset storage service 116 using the asset identifier supplied to the application 108, or obtained the file using any one of a number of techniques for transferring files.

In response to the determination that the file includes the features inserted by the subsequent version of the application, the application sends a request to a conversion service to convert the file to a format compatible with the application. For example at 504, the application 108 sends a job request to the job manager 206 of the conversion service 118 that is effective to cause the conversion service 118 to convert the file 110 to a format compatible with the application 108.

In response to sending the request, the application receives a converted file in the format that is compatible with the application. For example at 506, the application 108 receives a converted file from the conversion service 118 that the conversion service 118 has converted to a format compatible with the application 108. Optionally, the application 108 may receive the converted file by retrieving it from the asset storage service 116 using the asset identifier, receive it from the conversion service 118, or retrieve it from a cloud-based storage service.

Figure 6:
FIG. 6 is another flow diagram depicting another example procedure in accordance with one or more embodiments.

FIG. 6 depicts an example procedure 600 of in-application file conversion using cloud services. An application determines that a file includes portions marked as changed relative to a previous version of the file. For example at 602, the application 108 determines that the file 110 includes portions marked as changed relative to a previous version of the file 110 and that the file 110 includes features inserted by the subsequent version of the application 108. The application 108 may have received the file from another client computer 102 over network 120, may have retrieved the file 110 from the asset storage service 116 using the asset identifier supplied to the application 108, or obtained the file using any one of a number of techniques for transferring files.

In response to determining that the file includes portions marked as changed relative to a previous version of the file, a request is sent to a conversion service to cause the conversion service to convert the portions of the file marked as changed into a format compatible with the application and/or into an application-independent format. For example at 604, the application 108 sends the job request to the job manager 206 of the conversion service 118 to request the conversion service 118 convert the portions of file 110 marked as changed to a format compatible with the application 108 and/or to convert the portions marked as changed to the application-independent format.

In response to sending the request, the application receives a converted file compatible with the application and/or a second converted file in the application-independent format for the portions of the file marked as changed. For example at 606, the application 108 receives the converted file from the conversion service 118 in a format compatible with the application 108 and/or a second converted file in the application-independent format for the portions of the file 110 marked as changed. Optionally, the application 108 may receive the converted file by retrieving it from the asset storage service 116 using the asset identifier, receive it from the conversion service 118, or retrieve it from a cloud-based storage service.

The application displays the converted file and the second converted file in the application-independent format side-by-side in a user interface of the application. For example at 608, the application 108 displays the received converted file and the received second converted file in the application-independent format in the user interface of the application 108.

Figure 7:
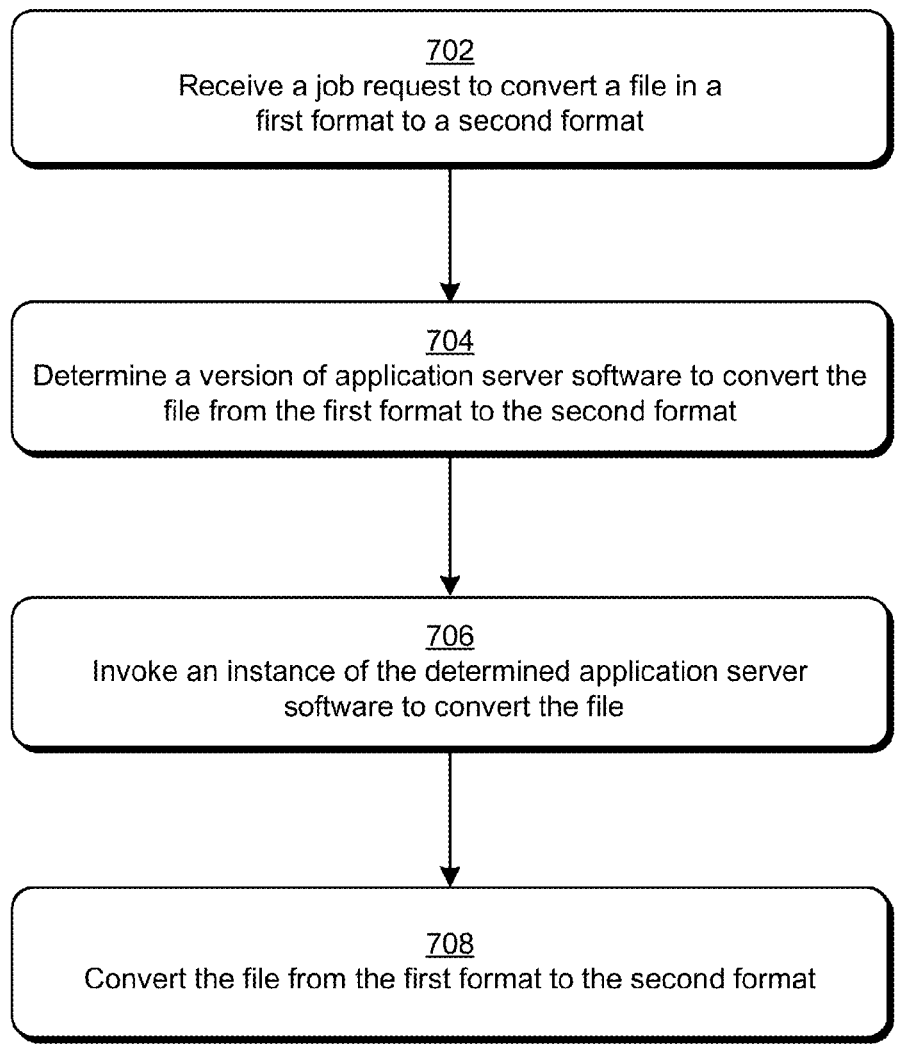
FIG. 7 is another flow diagram depicting another example procedure in accordance with one or more embodiments.

FIG. 7 depicts an example procedure 700 of in-application file conversion using cloud services. A job request is received to convert a file from a first format to a second format. For example at 702, the job manager 206 of the conversion service 118 receives the job request from the application 108 to convert the file 110 from the first format to the second format. The job manager 206 creates a conversion job including information received in the job request and enqueues the conversion job in the job queue 208.

Determination of a version, from multiple versions, of application server software to convert the file is made based on information included in the conversion job. For example at 704, the job manager 206 determines from information in the conversion job, which version of the application server software 210 will be used to convert the file 110.

The job manager invokes an instance of the determined application server software to convert the file based on the information included in the conversion job. For example at 706, the job manager 206 invokes an instance of application server software 210 to convert the file 110 from the first format to the second format.

The invoked instance of the application server software converts the file from the first format to produce a converted file in the second format. For example, at 708, the instance of the application server software 210 converts the file 110 from the first format to the second format. The instance of the application server software 210 may optionally store the converted file on the asset storage service 116, within the conversion service 118, or on a cloud-based storage system.

Figure 8:
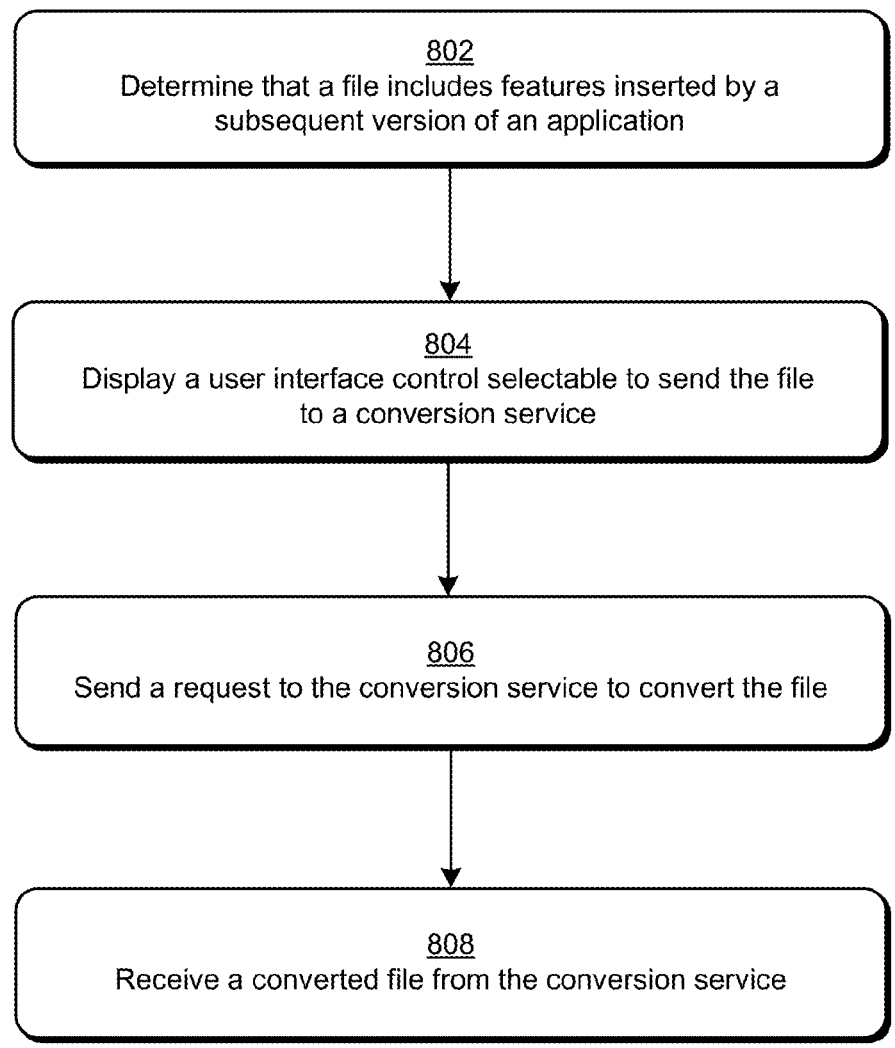
FIG. 8 is another flow diagram depicting another example procedure in accordance with one or more embodiments.

FIG. 8 depicts an example procedure 800 of in-application file conversion using cloud services. An application determines that a file includes features inserted by a subsequent version of the application. For example at 802, the version module 112 of the application 108 determines that the file 110 includes features inserted by a subsequent version of the application 108.

In response to the determination that the file includes the features inserted by the subsequent version of the application, a user interface of the application indicates to a user of the application that the file is not compatible with the application and displays a user interface control that the user may select to have the application use a conversion service to convert the file into a format compatible with the application. For example at 804, the conversion module 114 of the application 108 displays an indication that the file 110 is not compatible with the application 108 and displays a user interface control selectable by the user to cause the application 108 to send the file 110 to the conversion service 118 to convert the file 110 to a format compatible with the application 108.

In response to receiving an input to send the file for conversion, the application sends a request to the conversion service to cause the conversion service to convert the file to the format compatible with the application. For example at 806, the application 108 sends a job request to the job manager 206 of the conversion service 118 to have the conversion service 118 convert the file 110 to a format compatible with the application 108.

In response to sending the request, the application receives a converted file compatible with the application. For example at 808, the application 108 receives the converted file in the format compatible with the application 108 from the conversion service 118. Optionally, the application 108 may receive the converted file by retrieving it from the asset storage service 116 using the asset identifier, receive it from the conversion service 118, or retrieve it from a cloud-based storage service.

Having described example procedures in accordance with one or more embodiments, consider now an example system and device that can be utilized to implement the various techniques described herein.

Example System and Device

Figure 9:
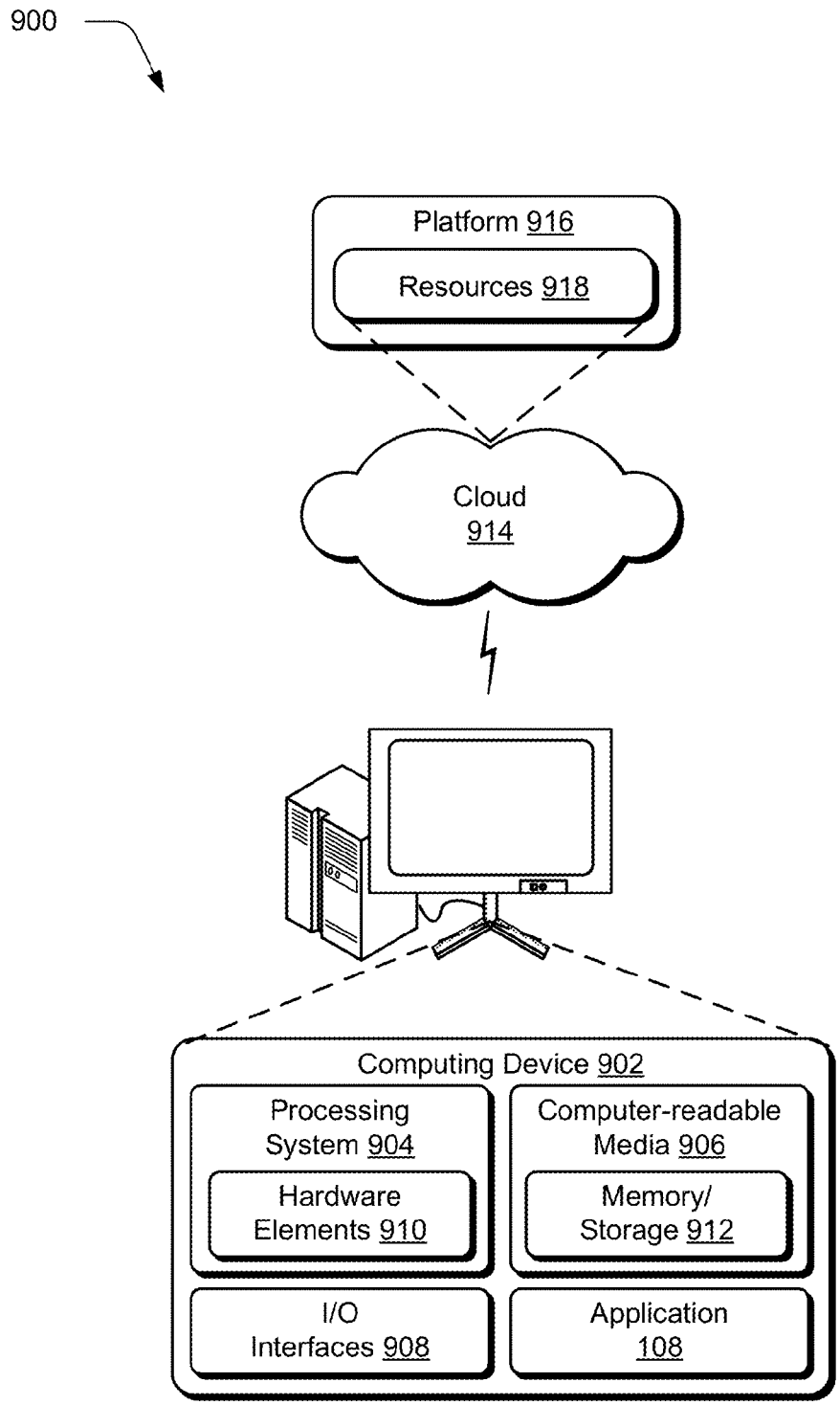
FIG. 9 illustrates an example system including various components of an example device that can be employed for one or more embodiments of in-application file conversion using cloud services described herein.

FIG. 9 illustrates an example system generally at 900 that includes an example computing device 902 that is representative of one or more computing systems and/or devices that may implement the various techniques described herein. This is illustrated through inclusion of the application 108, which operates as described above. The computing device 902 may be, for example, a server of a service provider, a device associated with a client (e.g., a client device), an on-chip system, and/or any other suitable computing device or computing system.

The example computing device 902 illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable storage media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

The input/output interface(s) 908 are representative of functionality to allow a user to enter commands and information to the computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 910 and the computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of the computer-readable storage media 906 and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of the computer-readable storage media 906 and/or the hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices or services. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for in-application file conversion at a client computer, the method comprising:
    determining, by an application executing on the client computer, from metadata included in a file that the file includes features inserted by a subsequent version of the application that are not compatible with the application;
    responsive to the determining, displaying, in a user interface of the application, a control that is selectable to send the file to a conversion service;
    responsive to receipt of an input to select the user interface control, sending a request to convert the file to the conversion service that is effective to cause the conversion service to convert the file to a first format compatible with the application, the request including parameters specifying options for the conversion, wherein the parameter options include whether to convert the file to a second format independent of the application; and
    responsive to the sending of the request, receiving the file that is converted from the subsequent version to the first format that is compatible with the application.

2. The method of claim 1, further comprising receiving a second version of the converted file from the conversion service, the second version of the converted file complying with an application-independent format.

3. The method of claim 2, wherein the received second version of the converted file is displayable to accurately display features in the file inserted by the subsequent version of the application that are not supported by the application.

4. The method of claim 3, further comprising displaying the converted file and the second version of the converted file in the user interface of the application on the client computer.

5. The method of claim 1, further comprising:
    sending the file to an asset storage service, that is effective to cause the asset storage service to store the file;
    responsive to the sending, receiving an asset identifier for the file assigned by the asset storage service; and
    sending the received asset identifier in the request to convert the file.

6. The method of claim 1, wherein the file includes portions marked as changed relative to a previous version of the file, the method further comprising:
    specifying an option to convert, solely, the portions in the file that are marked as changed from the previous version of the file; and
    receiving a converted file complying with the application-independent format comprising the changed portions of the file.

7. The method of claim 1, further comprising:
    responsive to the sending the request to convert the file, receiving a job identifier associated with the request;
    sending a status request to the conversion service, the status request comprising the job identifier; and
    receiving a status for the requested conversion.

8. A system for in-application file conversion, the system comprising:
    one or more processors; and
    one or more computer-readable-media, coupled to the one or more processors, comprising instructions executable by the one or more processors to implement a conversion service, the conversion service comprising:
        a plurality of versions of application server software, each corresponding to a respective one of a plurality of versions of a client application;
        a job manager configured to perform operations comprising:
            receiving a job request from the client application on a client computer to convert a file in a first format to a second format, the file including features inserted by a subsequent said version of the application that are not compatible with the version of the client application;
            responsive to the receiving the job request from the client computer, assigning a job identifier to the received job request;
            sending the assigned job identifier to the client computer;
            determining, for the conversion job, which version of the plurality of versions of the application server software is capable of performing the requested conversion;
            responsive to the determination, invoking an instance of the determined version of the application server software to convert the file from the first format to the second format;
        the plurality of versions of the application server software configured to perform operations comprising:
            receiving the conversion job from the job manager;
            converting the file in the first format associated with the conversion job to the second format that is compatible with the version of the client application; and
            converting the file to an application-independent third format, the file in the application-independent third format being displayable in the application to accurately display the features in the file inserted by the subsequent versions of the application that are not supported by the application.

9. The system of claim 8, further comprising an asset storage service configured to perform operations comprising:
    receiving a request from the client computer to store the file;
    assigning an asset identifier to the file;
    storing the file; and
    sending the assigned asset identifier to the client computer.

10. The system of claim 9, wherein the received job request includes the assigned asset identifier.

11. The system of claim 9, wherein the converting the file further comprises performing;
    sending the asset identifier to the asset storage service;

responsive to the sending the asset identifier, receiving the file corresponding to the asset identifier; and sending the converted file to the asset storage service that is effective to cause the asset storage service to store the converted file.

12. The system of claim 8, wherein one or more portions of the file are marked as having changed since a previous version of the file, and the converting is performed solely on the one or more portions of the file that are marked as changed.

13. The system of claim 8, the job manager being further configured to perform operations comprising:

receiving a status request, comprising the assigned job identifier from the client application on the client computer; and responsive to the receiving the status request, sending a status of the conversion job that is associated with the assigned job identifier to the client application.

14. One or more computer-readable storage media comprising instructions of an application stored thereon, the instructions executable by one or more processors to perform operations comprising:

determining, from metadata included in a file, that the file includes features inserted by a subsequent version of the application that are not compatible with the application;

responsive to the determining, displaying, in a user interface of the application, a control that is selectable to send the file to a conversion service;

responsive to receipt of an input to select the user interface control to send the file, sending a request to the conversion service to convert the file to a first format compatible with the application, the request including parameters specifying options for the conversion, wherein the parameter options include whether to convert the file to a second format independent of the application; and responsive to the sending the request, receiving the file that is converted to the first format that is compatible with the application.

15. The one or more computer-readable storage media of claim 14, the instructions further executable to perform operations comprising:

sending a request to an asset storage service to store the file, that is effective to cause the asset storage service to assign an asset identifier to the file and store the file; and receiving the asset identifier for the file from the asset storage service.

16. The one or more computer-readable storage media of claim 15, wherein the request sent to the conversion service comprises the asset identifier, the asset identifier being effective to cause the conversion service to obtain the file from the asset storage service.

17. The one or more computer-readable storage media of claim 14, wherein the request to convert the file specifies an option to convert the file to produce a second converted file complying with an application-independent format, the second converted file being displayable to accurately display features in the file inserted by the subsequent version of the application that are not supported by the application.

18. The one or more computer-readable storage media of claim 17, the instructions further executable to perform operations comprising:

receiving the second converted file; and displaying the converted file and the second converted file in the user interface of the application.

19. The one or more computer-readable storage media of claim 14, wherein the file includes portions marked as changed relative to a previous version of the file, and the instructions are further executable to perform operations comprising:

specifying an option in the request, to convert, solely, the portions in the file that are marked as changed from the previous version of the file; and receiving a converted file complying with the application-independent format comprising the changed portions of the file.

* * * * *